United States Patent Office 3,556,862
Patented Jan. 19, 1971

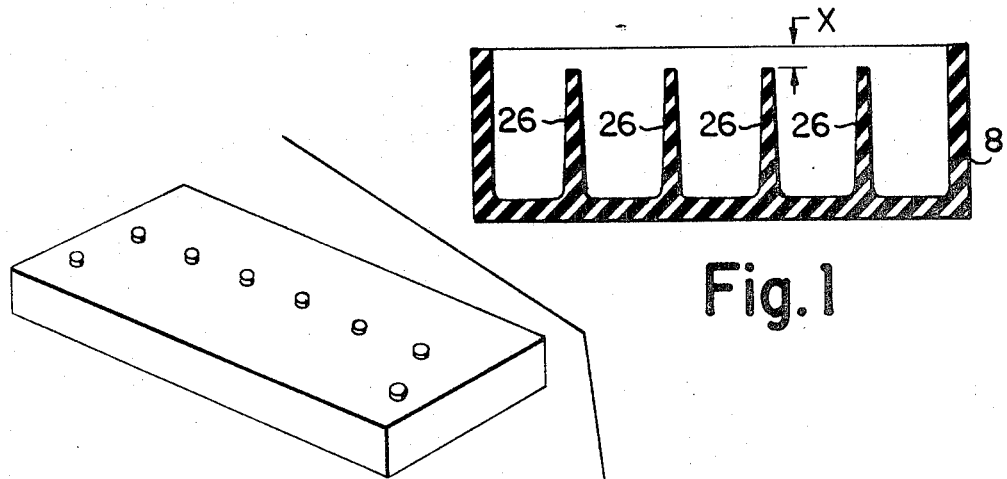
Fig. 1
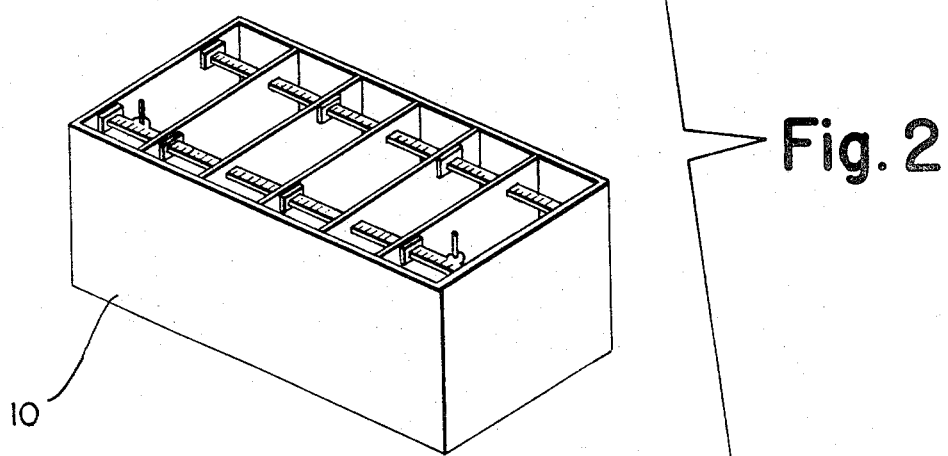
Fig. 2
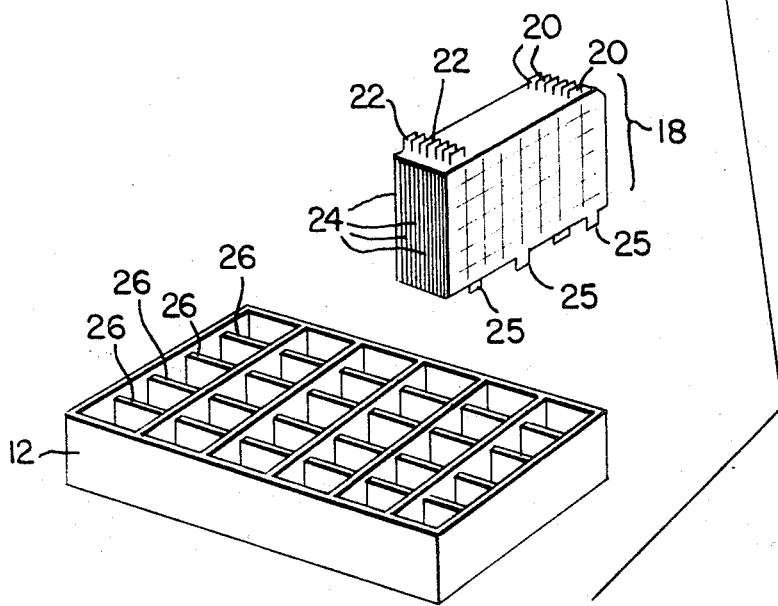

3,556,862
METHOD FOR MAKING A BATTERY HAVING ELECTRODES AND/OR SEPARATORS ANCHORED IN CONTAINER
Albert L. Fox, University Heights, Ohio, assignor to ESB Incorporated, a corporation of Delaware
Filed May 2, 1968, Ser. No. 725,999
Int. Cl. H01m 35/18
U.S. Cl. 136—176                                14 Claims

ABSTRACT OF THE DISCLOSURE

Rests in a battery container are softened and the battery electrodes and/or separators are pressed and embedded in the rests. The rests may be softened by any convenient technique including the use of solvents and heat. The container may be in one piece or may be in two portions which are sealed together; where the container is in two portions, the sealing may be done by any convenient technique including the use of heat.

CROSS REFERENCE TO RELATED APPLICATION

This application is related to one filed concurrently with this application entitled, "Battery Having Container in Two Portions and a Method for Making It," in which Frederick J. Port is the inventor.

BACKGROUND OF THE INVENTION

The desirability of anchoring the electrodes to the rests in the bottom of a battery container to increase the resistance to vibration and shock is well known. Constructions are shown in United States Pats. 2,934,582 and 3,350,238 in which the electrodes are anchored to the rests by resin cements.

SUMMARY OF THE INVENTION

With this invention the rests are softened and the electrodes and/or separators are pressed together with the rests. The pressing causes the electrodes and/or separators to make indentions in the rests, causing the electrodes and/or separators to become mechanically embedded in the rests.

Any convenient technique may be used to soften the rests, including the use of solvents and heat.

This invention may be used with a conventional one piece container or may be used with the two piece container disclosed and claimed in the cross-referenced related application listed above. Where the container is in two portions, the two portions may be sealed together while the electrodes and/or separators are being pressed and embedded into the rests; if the two portions are heat sealed together, heat may be applied to the mating surfaces while heat is applied to the rests.

BRIEF DESCRIPTION OF THE DRAWINGS

FIG. 1 is an end sectional view of a container illustrating the rests at the bottom. The figure may represent a conventional one piece container in which the upper edges of the container are actually well above the rests, and in this instance the outside container walls have been telescoped so that they appear only slightly above the rests. The figure may also represent the lower portion of a two piece container.

FIG. 2 is an exploded view of a battery in which the container consists of two portions. A stack for insertion into one of the cell compartments of the container is also shown. The lower portion of the container is shown having 4 rests in which electrodes and/or separators in the stack are to be embedded.

DESCRIPTION OF THE PREFERRED EMBODIMENTS

FIG. 1 shows a container 8 at the bottom of which are rests 26 for support of the battery electrodes. As shown in FIGS. 1 and 2, the rests 26 are integrally constructed with the bottom or lower portion of the container 8. FIG. 2 shows a stack 18 including alternately spaced positive electrodes 20 and negative electrodes 22. (The automotive battery electrodes shown in FIG. 2 are merely illustrative of one type of electrode with which this invention might be used; the invention is not limited to flat, platelike electrodes, is not limited to rechargeable electrodes, and is not limited to automotive batteries.) Also shown in FIG. 2 are separators 24 which may be required between adjacent electrodes of opposite polarity to prevent self-discharge of the electrodes. It is conventional practice in the automotive battery industry today, but not an essential requirement, to construct the electrode grids with a pair of feet 25, the feet being part of the electrodes. When the electrodes are placed into the container the feet of the electrodes conventionally rest on and are supported by the rests 26; in the two patents cited in the background the feet and the rests are cemented together to achieve the desired anchoring.

In this invention the rests are to be softened and the electrodes and/or separators then embedded into the softened rests. Anchoring is achieved by mechanical embedment rather than by cementing. Depending upon whether the bottoms of the electrodes project below the bottoms of the separators, or vice versa, and depending on how far the stack of electrodes and separators are pressed into the softened rests, either the electrodes or the separators or both of them may be embedded in the rests.

While the invention is essentially independent of specific container materials, specific softening techniques, and specific combinations thereof, it is recognized that certain materials may be more readily softened with one technique than with another technique. For instance, materials such as polystyrene and acrylonitrile butadiene styrene are readily softened by the use of solvents, while polyethylene, polyvinylchloride, and acrylonitrile butadiene styrene may be softened with heat. The softening should be temporary in nature so that after the electrodes and/or separators are embedded the rests will subsequently harden again. If heat is used as a softening technique the container material must be thermoplastic, but otherwise both thermoplastic and thermosetting materials may be used with this invention.

If a heat technique is used to soften the rests, the heat may be applied directly to the rests. As an alternative, the heat might be applied directly to the electrodes and the heated electrodes then placed in contact with and embedded in the rests. If the temperatures required are such as to produce damage to the electrode if all of the heat is applied directly to the electrode, the heat might be divided so that some is applied directly to the electrodes and some directly to the rests. In each of these instances the process might be described as heating the rests and placing the electrodes into the container, the difference being that in some instances the rests are heated before the electrodes are placed into the container while in other instances the rests are heated by the electrodes as the electrodes are placed in the container. Heat may be applied directly to the rests where only the separators are to be embedded. Depending upon temperatures used, the properties of the container material, the dimensions of the rests, and other factors, the electrodes and/or separators may be bonded to the rests when mechanically embedded into the rests, but achievement of a bond or seal between the electrodes and/or separators and rests is not an essential requirement of this method.

This invention may be used with conventional containers in which the upper outside edges of the container are actually well above the rests; the distance "x" shown in FIG. 1 may therefore be relatively large, a matter of several inches.

The invention may also be used with a two-piece container such as that shown in FIG. 2. There the container is divided into an upper portion 10 and a lower portion 12 which, at some point in the process of assembling the battery, must be sealed together. The joint or division between the two portions is not limited to any exact location along the overall height of the entire container, although the joint is shown in FIG. 2 to be near the bottom of the container. If this invention is to be used with such a container then two events must occur during the assembly of the battery, which events may occur either successively or simultaneously: the rests must be softened and the electrodes and/or separators pressed into them, and the two portions of the container must be sealed together. The requirement for these two events is indepndent of the location of the joint, the difference in height if any between the top of the rests and the top of the container (distance "x" in FIG. 1), or the technique used in sealing the two portions of the container together. Since the electrodes and/or separators must be pressed into the rests to become embedded therein and since certain sealing techniques may require that the two portions of the container be pressed together, it is advantageous in such instances to do both simultaneously. An additional advantage can be obtained if the rests are softened by heat and if heat sealing is the sealing technique employed, for in that instance not only can the sealing occur simultaneously with pressing the electrodes and/or separators into the rests but the heat may also be simultaneously applied to the rests and to the mating surfaces of the two portions of the container, thereby combining into one step what would otherwise have to be done in two. Thus in one embodiment it is possible to obtain the desired anchoring without an additional and separate step of applying heat to the rests. Where the two portions of the container are heat sealed together, it may be advantageous from the point of view of constructing heating devices to have the top of the rests be in the plane with the top of the outside wall of lower portion of the container (e.g., distance "x" in FIG. 1 is zero), but this relationship is not essential; the tops of the rests may be either above or below the outside walls.

While the two inventions are essentially independent of each other, this invention may be conveniently used along with the invention disclosed and claimed in the cross-referenced application listed above. In the other application one essential limitation is that the container be constructed in two portions, a limitation which does not apply to all embodiments of the present invention. The invention in the related application also requires that some of the strap connectors connecting plates together in multicell batteries extend through the partitions in the upper portion of the container, a requirement not applicable to the practice of the present invention with multicell batteries. The two portions of the container required by the invention of the related application may also be sealed together without anchoring the electrodes in the lower portion of the container as shown by the present invention.

The present invention may be employed with either single cell or multicell batteries.

I claim:
1. A method of anchoring the electrodes in a battery container, the interior of the container having rests at the bottom thereof, the rests being integrally constructed with the container, the method consisting of:
 (a) softening the rests;
 (b) placing electrodes into the container; and,
 (c) pressing the electrodes and rests together until the electrodes are embedded in the rests.

2. The method of claim 1 in which the rests are softened by a solvent.

3. The method of claim 1 in which the rests are softened by applying heat directly to the rests.

4. The method of claim 1 in which the rests are softened by applying heat directly to the electrodes and then placing the heated electrodes in contact with the rests.

5. The method of claim 3 in which the rests are also softened by applying heat directly to the electrodes and then placing the heated electrodes in contact with the rests.

6. A method of anchoring the electrodes in a battery container consisting of an upper portion and a lower portion, the lower portion having rests at the bottom thereof, the rests being integrally constructed with the lower portion of the container, the method consisting of:
 (a) softening the rests;
 (b) placing electrodes into the container; and,
 (c) simultaneously pressing the electrodes and rests together with sufficient force to embed the electrodes in the rests and sealing the two portions of the container together.

7. The method of claim 6 in which the rests are softened with heat.

8. The method of claim 7 in which the mating surfaces of the two portions of the container are also heated and then heat sealed together.

9. A method of anchoring the separators in a battery container, the interior of the container having rests at the bottom thereof, the rests being integrally constructed with the container, the method consisting of:
 (a) softening the rests;
 (b) placing separators into the container; and,
 (c) pressing the separators and rests together until the separators are embedded in the rests.

10. The method of claim 9 in which the rests are softened by a solvent.

11. The method of claim 9 in which the rests are softened by applying heat to the rests.

12. A method of anchoring the separators in a battery container consisting of an upper portion and a lower portion, the lower portion having rests at the bottom thereof, the rests being integrally constructed with the lower portion of the container, the method consisting of
 (a) softening the rests;
 (b) placing separators into the container; and,
 (c) simultaneously pressing the separators and rests together with sufficient force to embed the separators in the rests and sealing the two portions of the container together.

13. The method of claim 12 in which the rests are softened with heat.

14. The method of claim 13 in which the mating surfaces of the two portions of the container are also heated and then heat sealed together.

References Cited

UNITED STATES PATENTS

| | | | |
|---|---|---|---|
| 1,371,998 | 3/1921 | Gill | 136—81.3 |
| 1,562,887 | 11/1925 | Jackson | 136—81.4 |
| 2,934,582 | 4/1960 | Wilson | 136—17 |
| 3,269,865 | 8/1966 | Swanson | 136—80 |
| 3,350,238 | 10/1967 | Wilson | 136—80 |
| 3,369,936 | 2/1968 | Noll | 136—80 |
| 3,369,937 | 2/1968 | Himy | 136—80 |

ALLEN B. CURTIS, Primary Examiner

C. F. LeFEVOUR, Assistant Examiner

U.S. Cl. X.R.

136—80; 156—298